US012759275B2

(12) United States Patent
Koyama et al.

(10) Patent No.: US 12,759,275 B2
(45) Date of Patent: Oct. 13, 2026

(54) PANEL PRODUCTION DEVICE AND PANEL PRODUCTION METHOD

(71) Applicants: MITSUBISHI HEAVY INDUSTRIES, LTD., Tokyo (JP); Mitsubishi Heavy Industries Machinery Systems, Ltd., Hyogo (JP)

(72) Inventors: Takayuki Koyama, Tokyo (JP); Akio Fukuda, Tokyo (JP); Kiyoka Takagi, Tokyo (JP); Katsuya Sennyu, Hyogo (JP); Yoshinao Takakuwa, Hyogo (JP); Takayuki Miyake, Hyogo (JP); Katsuhide Aikawa, Hyogo (JP)

(73) Assignees: MITSUBISHI HEAVY INDUSTRIES, LTD., Tokyo (JP); MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 188 days.

(21) Appl. No.: 18/286,874

(22) PCT Filed: Feb. 14, 2022

(86) PCT No.: PCT/JP2022/005669
§ 371 (c)(1),
(2) Date: Oct. 13, 2023

(87) PCT Pub. No.: WO2022/219907
PCT Pub. Date: Oct. 20, 2022

(65) Prior Publication Data

US 2024/0190111 A1 Jun. 13, 2024

(30) Foreign Application Priority Data

Apr. 16, 2021 (JP) ................................ 2021-069993

(51) Int. Cl.
*B32B 37/06* (2006.01)
*B32B 3/28* (2006.01)
(Continued)

(52) U.S. Cl.
CPC ................ *B32B 37/06* (2013.01); *B32B 3/28* (2013.01); *B32B 5/18* (2013.01); *B32B 27/08* (2013.01); *B32B 37/04* (2013.01); *B32B 37/08* (2013.01); *B32B 37/10* (2013.01); *B32B 41/00* (2013.01); *B32B 2305/022* (2013.01); *B32B 2307/738* (2013.01); *B32B 2398/20* (2013.01)

(58) Field of Classification Search
CPC ......... B32B 37/04; B32B 37/06; B32B 37/08; B32B 37/10; B32B 37/0076; B32B 41/00;
(Continued)

(56) References Cited

U.S. PATENT DOCUMENTS

| | | | |
|---|---|---|---|
| 3,811,987 A | 5/1974 | Wilkinson et al. | |
| 4,086,116 A | 4/1978 | Yazaki et al. | |

(Continued)

FOREIGN PATENT DOCUMENTS

| | | | |
|---|---|---|---|
| DE | 4208812 A1 * | 9/1993 | ............... B32B 3/12 |
| GB | 1169701 A * | 11/1969 | |

(Continued)

OTHER PUBLICATIONS

Extended European Search Report issued Oct. 31, 2024 in European Patent Application No. 22787835.2.

(Continued)

*Primary Examiner* — John L Goff, II
(74) *Attorney, Agent, or Firm* — Wenderoth, Lind & Ponack, L.L.P.

(57) ABSTRACT

A panel production device includes: a transfer part that transfers, in a transfer direction, a panel having a core member that includes a thermoplastic resin and is formed in a corrugated shape, and a first faceplate that includes a thermoplastic resin, is formed in a plate shape, and is joined (Continued)

to a surface on one side of the core member; a supply part that supplies, toward a surface on the other side of the core member, a second faceplate that includes a thermoplastic resin and is formed in a plate shape; a heating part that heats at least one surface of respective surfaces of the core member and the second faceplate facing each other; and a pressurizing part that pressurizes and welds the core member of the panel and the second faceplate.

7 Claims, 6 Drawing Sheets

(51) Int. Cl.

| | |
|---|---|
| ***B32B 5/18*** | (2006.01) |
| ***B32B 27/08*** | (2006.01) |
| ***B32B 37/04*** | (2006.01) |
| ***B32B 37/08*** | (2006.01) |
| ***B32B 37/10*** | (2006.01) |
| ***B32B 41/00*** | (2006.01) . |

(58) Field of Classification Search

CPC ............... B32B 3/28; B32B 2310/0843; B29L 2024/03; B29L 2024/003; B29C 65/1432; B29C 65/1632; B29C 65/18; B29C 66/0342; B29C 66/438; B29C 66/91221; B29C 66/91421; B29C 65/1654; B29C 65/1667; B29C 65/1645; B29C 65/1648; B29C 65/1658; B29C 65/1454; Y10T 156/1025; Y10T 156/1021; Y10T 156/1016; B31F 1/20; B31F 1/24; B31F 1/28; B31F 1/2804

USPC ..... 156/290, 292, 205, 208, 210, 462, 272.8

See application file for complete search history.

(56) References Cited

U.S. PATENT DOCUMENTS

| | | | | |
|---|---|---|---|---|
| 4,132,581 | A * | 1/1979 | Swartz | B29C 66/438 264/286 |
| 5,114,509 | A | 5/1992 | Johnston et al. | |
| 7,754,312 | B2 | 7/2010 | Nakajima et al. | |
| 11,911,972 | B2 | 2/2024 | Mayer et al. | |
| 2005/0016690 | A1 | 1/2005 | Gmeiner | |
| 2005/0095405 | A1 | 5/2005 | Park et al. | |
| 2005/0214512 | A1 | 9/2005 | Fascio | |
| 2008/0128080 | A1 | 6/2008 | Nakajima et al. | |
| 2014/0137977 | A1 * | 5/2014 | Cik | B23K 20/10 219/121.64 |
| 2015/0007942 | A1 * | 1/2015 | Hung | B31F 1/285 156/378 |
| 2017/0087029 | A1 | 3/2017 | Nelson et al. | |
| 2022/0234300 | A1 | 7/2022 | Mayer et al. | |
| 2024/0190111 | A1 | 6/2024 | Koyama et al. | |

FOREIGN PATENT DOCUMENTS

| | | |
|---|---|---|
| JP | H01-130880 | 5/1989 |
| JP | H04-172182 | 6/1992 |
| JP | 7-195595 | 8/1995 |
| JP | 8-156087 | 6/1996 |
| JP | 10-96274 | 4/1998 |
| JP | 2000-343232 | 12/2000 |
| JP | 2002-517333 | 6/2002 |
| JP | 2010-147757 | 7/2010 |
| JP | 2018-535846 | 12/2018 |
| JP | 2019-188802 | 10/2019 |
| WO | 99/64221 | 12/1999 |
| WO | 03/080326 | 10/2003 |
| WO | 2010/052485 | 5/2010 |

OTHER PUBLICATIONS

Written Opinion of the International Searching Authority issued Apr. 5, 2022 in International (PCT) Application No. PCT/JP2022/005669, with English-language translation.

Extended European Search Report issued Oct. 7, 2024 in European patent application No. 22787834.5.

Office Action issued Sep. 30, 2025 in U.S. Appl. No. 18/286,869.

Office Action issued Apr. 30, 2026 in U.S. Appl. No. 18/286,869.

Phillips, David H. (2016). Welding Engineering—An Introduction—4.3.3 Ultrasonic Welding. John Wiley & Sons. Retrieved from https://app.knovel.com/hotlink/pdf/id:kt011 UNVF1/welding-engineering-an/ultrasonic-welding (Year: 2016).

* cited by examiner

PANEL PRODUCTION DEVICE AND PANEL PRODUCTION METHOD

TECHNICAL FIELD

The present disclosure relates to a panel production device and a panel production method.

BACKGROUND ART

In the related art, there is known a method of producing a composite sheet in which a first sheet and a second sheet that are overlapped with each other are fused by ultrasonic vibration (refer to, for example, PTL 1). The first sheet is formed into a corrugated shape by a first roll and is fused to the second sheet having a plate shape.

CITATION LIST

Patent Literature

[PTL 1] Japanese Unexamined Patent Application Publication No. 2019-188802

SUMMARY OF INVENTION

Technical Problem

An example of a panel such as the composite sheet includes a so-called sandwich panel in which a corrugated core member is disposed between two faceplates. In PTL 1, the core member serving as the first sheet is fused with the faceplate on one side serving as the second sheet to produce the composite sheet. On the other hand, there is no description or suggestion in PTL 1 regarding the fusion between the panel such as the composite sheet and the faceplate on the other side, and there is room for improvement.

An object of the present disclosure is to provide a panel production device and a panel production method capable of suitably producing a panel composed of two faceplates and a core member.

Solution to Problem

A panel production device of the present disclosure includes a transfer part that transfers, in a transfer direction, a panel having a core member that includes a thermoplastic resin and is formed in a corrugated shape, and a first faceplate that includes a thermoplastic resin, is formed in a plate shape, and is joined to a surface on one side of the core member, a supply part that supplies, toward a surface on the other side of the core member, a second faceplate that includes a thermoplastic resin and is formed in a plate shape, a heating part that heats at least one surface of respective surfaces of the core member and the second faceplate facing each other, and a pressurizing part that pressurizes and welds the core member of the panel and the second faceplate.

A panel production method according to the present disclosure includes a step of transferring, in a transfer direction, a panel having a core member that includes a thermoplastic resin and is formed in a corrugated shape, and a first faceplate that includes a thermoplastic resin, is formed in a plate shape, and is joined to a surface on one side of the core member, a step of supplying, toward a surface on the other side of the core member, a second faceplate that includes a thermoplastic resin and is formed in a plate shape, a step of heating at least one surface of respective surfaces of the core member and the second faceplate facing each other, and a step of pressurizing and welding the core member of the panel and the second faceplate.

Advantageous Effects of Invention

According to the present disclosure, it is possible to suitably produce a panel composed of two faceplates and a core member.

DESCRIPTION OF EMBODIMENTS

Figure 1:
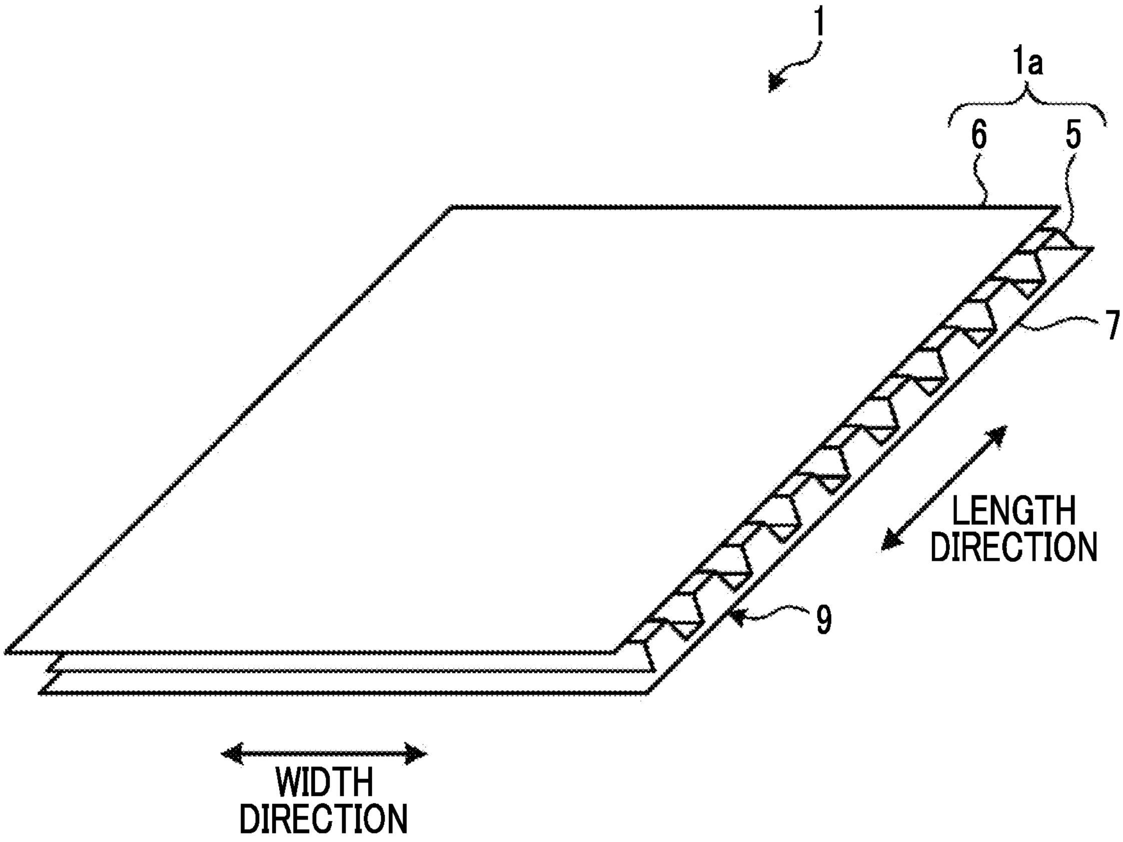
FIG. 1 is a perspective view of a panel according to a first embodiment.

Hereinafter, an embodiment according to the present disclosure will be described in detail based on drawings. The invention is not limited to the embodiment. Further, components in the following embodiment include components that can be easily replaced by those skilled in the art or components that are substantially the same. Furthermore, the components described below can be combined as appropriate, and in a case where there are a plurality of embodiments, the respective embodiments can also be combined.

First Embodiment

In a panel production device 10 according to a first embodiment, faceplates 6 and 7 having a plate shape are joined to both surfaces of a core member 5 having a corrugated shape to produce a sheet-shaped sandwich panel (hereinafter, simply referred to as panel 1). Prior to the description of the panel production device 10, the panel 1 will be described.

(Panel)

FIG. 1 is a perspective view of the panel according to the first embodiment. As shown in FIG. 1, the panel 1 is a sheet-shaped panel that is a flat plate extending in a width direction and a length direction. The length direction of the panel 1 is a transfer direction in the panel production device 10 described below. The panel 1 includes a core member 5, a first faceplate 6, and a second faceplate 7. The core member 5, the first faceplate 6, and the second faceplate 7 are configured to include a thermoplastic resin. The core member 5, the first faceplate 6, and the second faceplate 7 may be a composite material containing a reinforcing fiber in addition to the thermoplastic resin. Further, the thermoplastic resins used in the core member 5, the first faceplate 6, and the second faceplate 7 may be different types of thermoplastic resins.

The core member 5 is formed in the corrugated shape. Specifically, the core member 5 has a wave shape in which peaks and valleys are alternately and continuously formed in the length direction, and is formed such that tops of the peaks and bottom portions of the valleys extend in the width direction. The corrugated shape is not particularly limited to the above-mentioned shape, and may be, for example, an embossed shape in which undulations are formed in a staggered manner. That is, any shape may be employed as long as the shape can be continuously formed in the transfer direction in the panel production device 10 described below.

The first faceplate 6 is joined to a surface on one side (upper side in FIG. 1) of the core member 5. The first faceplate 6 is formed in a plate shape. The first faceplate 6 is joined to the tops of the peaks of the core member 5, while being separated from the bottom portions of the valleys of the core member 5.

The second faceplate 7 is joined to a surface on the other side (lower side in FIG. 1) of the core member 5. The second faceplate 7 is formed in a plate shape. The second faceplate 7 is joined to the bottom portions of the valleys of the core member 5, while being separated from the tops of the peaks of the core member 5. The second faceplate 7 is provided with a welding part 9 as a joined part, which is a portion to be joined to the core member 5.

In the panel 1, the core member 5 and the first faceplate 6 are first joined to form a panel 1*a*, and then the panel 1*a* and the second faceplate 7 are joined to form the sandwich panel shown in FIG. 1.

(Panel Production Device)

Figure 2:
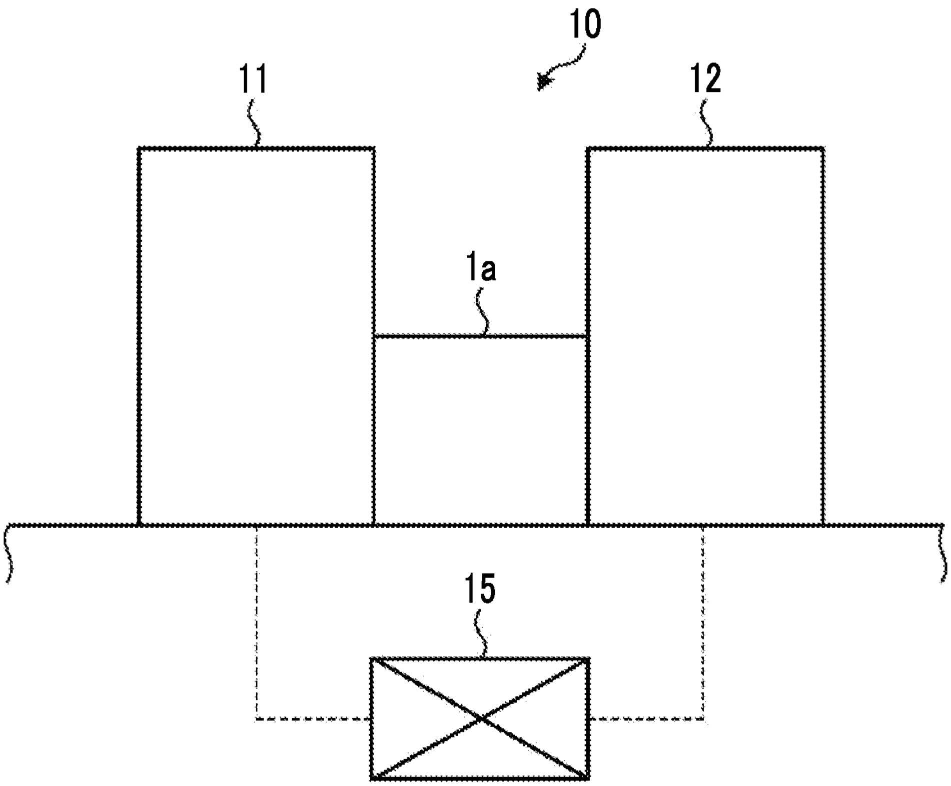
FIG. 2 is a schematic configuration diagram representing a panel production device according to the first embodiment.
Figure 3:
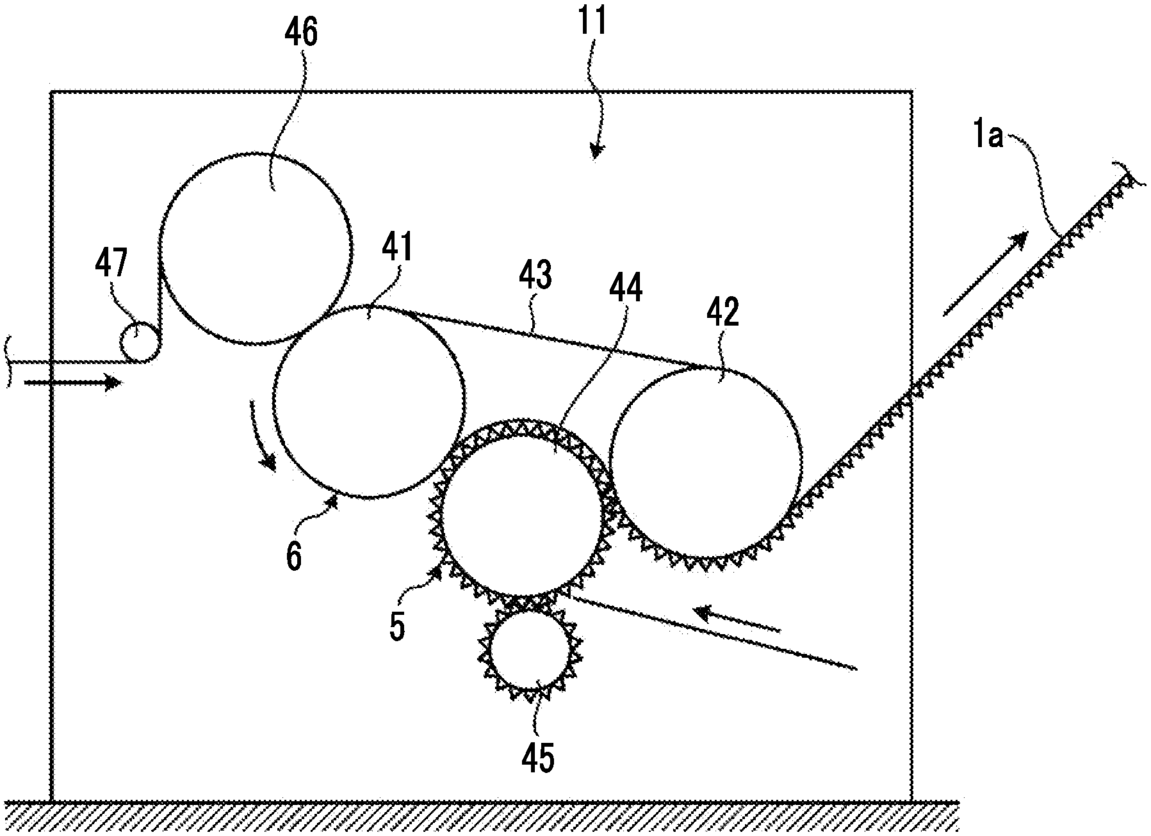
FIG. 3 is a schematic configuration diagram representing a single facer.
Figure 4:
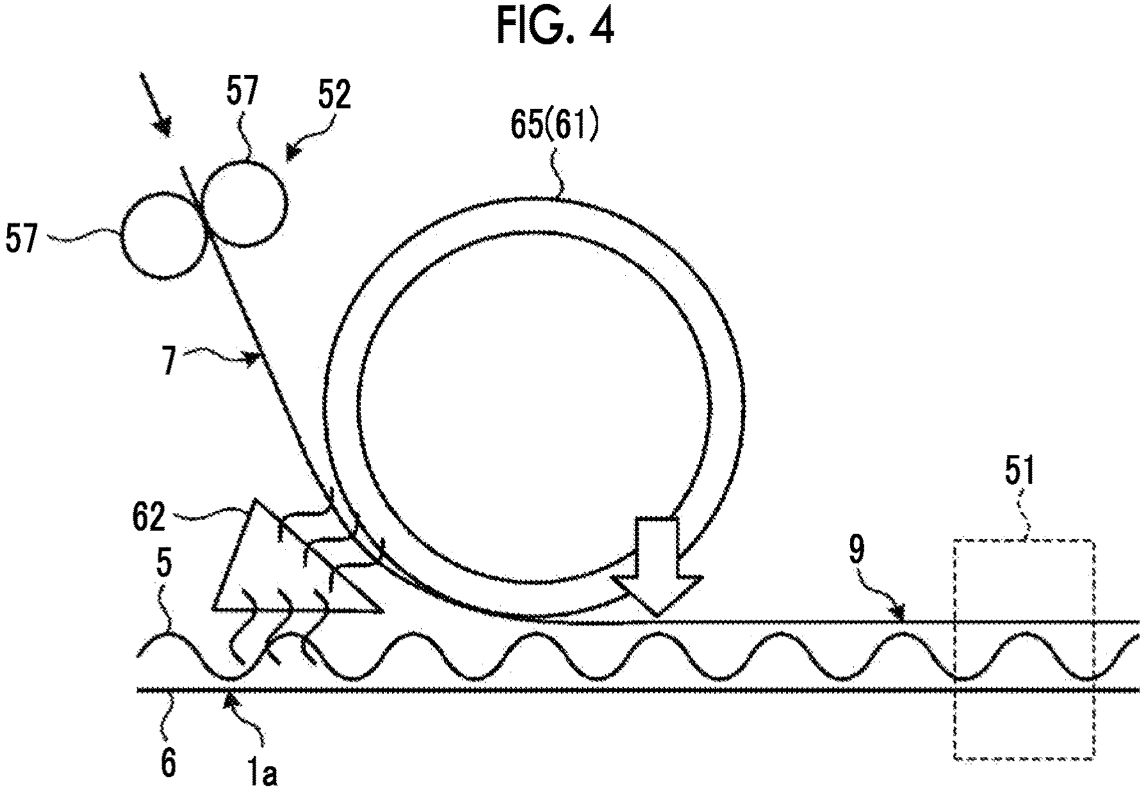
FIG. 4 is a schematic configuration diagram representing a double facer.

Next, the panel production device 10 will be described with reference to FIGS. 2 to 4. FIG. 2 is a schematic configuration diagram representing a panel production device according to the first embodiment. FIG. 3 is a schematic configuration diagram representing a single facer. FIG. 4 is a schematic configuration diagram representing a double facer. As shown in FIG. 2, the panel production device 10 includes a single facer 11, a double facer 12, and a control device 15.

(Single Facer)

The single facer 11 is a device that joins the core member 5 and the first faceplate 6 to form the panel 1*a*. The single facer 11 includes a belt roll 41, a tension roll 42, a pressurizing belt 43, an upper corrugating roll 44, and a lower corrugating roll 45.

The belt roll 41 can be driven and rotated by a drive device (not shown). The tension roll 42 is rotatably supported at a predetermined spacing from the belt roll 41. The pressurizing belt 43 is an endless belt and is wound around the belt roll 41 and the tension roll 42. The upper corrugating roll 44 can be driven and rotated by a drive device (not shown), and the outer peripheral surface thereof is formed in a wave shape. The upper corrugating roll 44 is disposed below the pressurizing belt 43 in a vertical direction between the belt roll 41 and the tension roll 42, and the wave-shaped outer peripheral surface comes into contact with a lower surface of the pressurizing belt 43 in a pressurized state. As in the upper corrugating roll 44, the lower corrugating roll 45 has the outer peripheral surface formed in a wave shape and is engaged with the outer peripheral surface of the upper corrugating roll 44 below the upper corrugating roll 44 in a vertical direction.

The first faceplate 6 supplied to the single facer 11 is wound around a guide roller 47 on an upstream side and then wound around a guide roller 46 on a downstream side. Thereafter, together with the pressurizing belt 43 guided by the belt roll 41, the first faceplate 6 is sandwiched between the pressurizing belt 43 and the upper corrugating roll 44 and is pressurized. On the other hand, the plate-shaped core member 5 before shaping is shaped into a wave shape at the engaging portion between the upper corrugating roll 44 and the lower corrugating roll 45, and then guided by the upper corrugating roll 44 to be supplied between the pressurizing belt 43 and the upper corrugating roll 44.

Further, the single facer 11 includes a joining device (not shown) that joins the first faceplate 6 and the core member 5. The joining device melts the top of the peak of the core member 5 by heating. In the single facer 11, the core member 5 whose top of the peak is melted is transferred between the pressurizing belt 43 and the upper corrugating roll 44 and is pressurized, together with the first faceplate 6, between the pressurizing belt 43 and the upper corrugating roll 44 to join the core member 5 and the first faceplate 6. The single facer 11 joins the core member 5 and the first faceplate 6 to form the panel 1*a* and transfers the formed panel 1*a* toward the double facer 12.

(Double Facer)

The double facer 12 is a device that joins the panel 1*a* and the second faceplate 7 to form the panel 1 to be the sandwich panel. The double facer 12 includes a transfer part 51, a supply part 52, a heating part 62, and a pressurizing part 61.

The transfer part 51 is a device that transfers the panel 1*a* in the transfer direction. The transfer part 51 sandwiches, from both sides, the panel 1 after the second faceplate 7 is joined to the panel 1*a* and delivers the panel 1 in the transfer direction to transfer the panel 1*a*. The transfer part 51 may be configured by using a plurality of transfer rollers or may be configured by using an endless belt such as the pressurizing belt 43 of the single facer 11.

The supply part 52 is a device that supplies the second faceplate 7 toward the surface on the other side of the core member 5 of the panel 1*a*. The supply part 52 has a pair of transfer rollers 57 that sandwiches the second faceplate 7 and delivers the second faceplate 7 toward the pressurizing part 61.

The heating part 62 heats surfaces of the core member 5 and the second faceplate 7 facing each other to raise the temperature to a temperature at which heat welding is possible. Specifically, the heating part 62 is, for example, a heating heater, a laser, or a heating lamp, and is provided at a position on an upstream side in the transfer direction of the pressurizing part 61. The heating part 62 is provided in a space formed between the core member 5 and the second faceplate 7 and heats the surface on the other side of the core member 5 and the surface of the second faceplate 7 facing the core member 5. Specifically, the heating part 62 has a wedge shape that tapers toward a space where the core member 5 and the second faceplate 7 are welded. Therefore, the heating part 62 can perform the heating until immediately before the core member 5 and the second faceplate 7 are welded. The heating part 62 is not particularly limited to the wedge shape and may have a flat plate shape extending toward a space between the core member 5 and the second faceplate 7. In the heating part 62, a distance to the bottom portion of the valley of the core member 5 is closer than a distance to the top of the peak of the core member 5. Thus, it is possible to raise the temperature for the bottom portion of the valley of the core member 5. Further, in the heating part 62, since the distance to the top of the peak of the core member 5 is far from the distance to the bottom portion of the valley of the core member 5, unnecessary temperature rise in other portions including the top of the peak of the core member 5 can be suppressed. Accordingly, it is possible to perform the welding while suppressing deformation of the entire panel 1.

The pressurizing part 61 pressurizes and joins the heated panel 1*a* and second faceplate 7 to form the welding part 9. The pressurizing part 61 has a pressurizing roller 65. The pressurizing roller 65 is in rolling contact with an outer surface of the second faceplate 7. The pressurizing roller 65 may be heated by a heating source (not shown) to contribute to the joining between the core member 5 and the second faceplate 7.

The panel 1*a* transferred from the single facer 11 to the double facer 12 is supplied toward the pressurizing roller 65 by the transfer part 51. Further, the second faceplate 7 supplied to the double facer 12 is supplied toward the pressurizing roller 65 by the transfer roller 57. In this case, the second faceplate 7 is supplied to the surface on the other side of the core member 5 of the panel 1*a*.

In the double facer 12, the heating part 62 heats the surfaces of the core member 5 and the second faceplate 7 facing each other, respectively to raise the temperature to the temperature at which the heat welding is possible. Thereafter, in the double facer 12, the pressurizing roller 65 pressurizes the supplied panel 1*a* and second faceplate 7 to weld the bottom portion of the valley of the core member 5 of the panel 1*a* and the second faceplate 7.

The double facer 12 discharges the panel 1 obtained by joining the panel 1*a* and the second faceplate 7. The discharged panel 1 may be discharged as it is or may be cut into a single-wafer sheet, and is not particularly limited.

The control device 15 is connected to the single facer 11 and the double facer 12 and controls the drive thereof. Specifically, in the double facer 12, the control device 15 is connected to the heating part 62 and controls the heating by the heating part 62.

(Panel Production Method)

Next, a panel production method of producing the panel 1 using the panel production device 10 will be described. As shown in FIG. 3, in the single facer 11, the panel production device 10 shapes the core member 5 having the corrugated shape and joins the shaped core member 5 and the first faceplate 6 to form the panel 1*a*. The panel production device 10 transfers the formed panel 1*a* from the single facer 11 toward the double facer 12.

As shown in FIG. 4, in the panel production device 10, the transfer part 51 transfers the panel 1*a* in the transfer direction (length direction) in the double facer 12 to supply the panel 1*a* toward the pressurizing roller 65. Further, in the panel production device 10, the transfer roller 57 of the supply part 52 supplies the second faceplate 7 toward the surface on the other side of the core member 5. In the panel production device 10, in a case where the panel 1*a* and the second faceplate 7 are supplied to the pressurizing roller 65, the panel 1*a* and the second faceplate 7 are heated by the heating part 62 before being pressurized. Specifically, in the panel production device 10, the heating part 62 heats the surfaces of the core member 5 and the second faceplate 7 facing each other to raise the temperature to the temperature at which the heat welding is possible. Thereafter, in the panel production device 10, the pressurizing roller 65 pressurizes the supplied panel 1*a* and second faceplate 7 to weld the bottom portion of the valley of the core member 5 of the panel 1*a* and the second faceplate 7.

Second Embodiment

Figure 5:
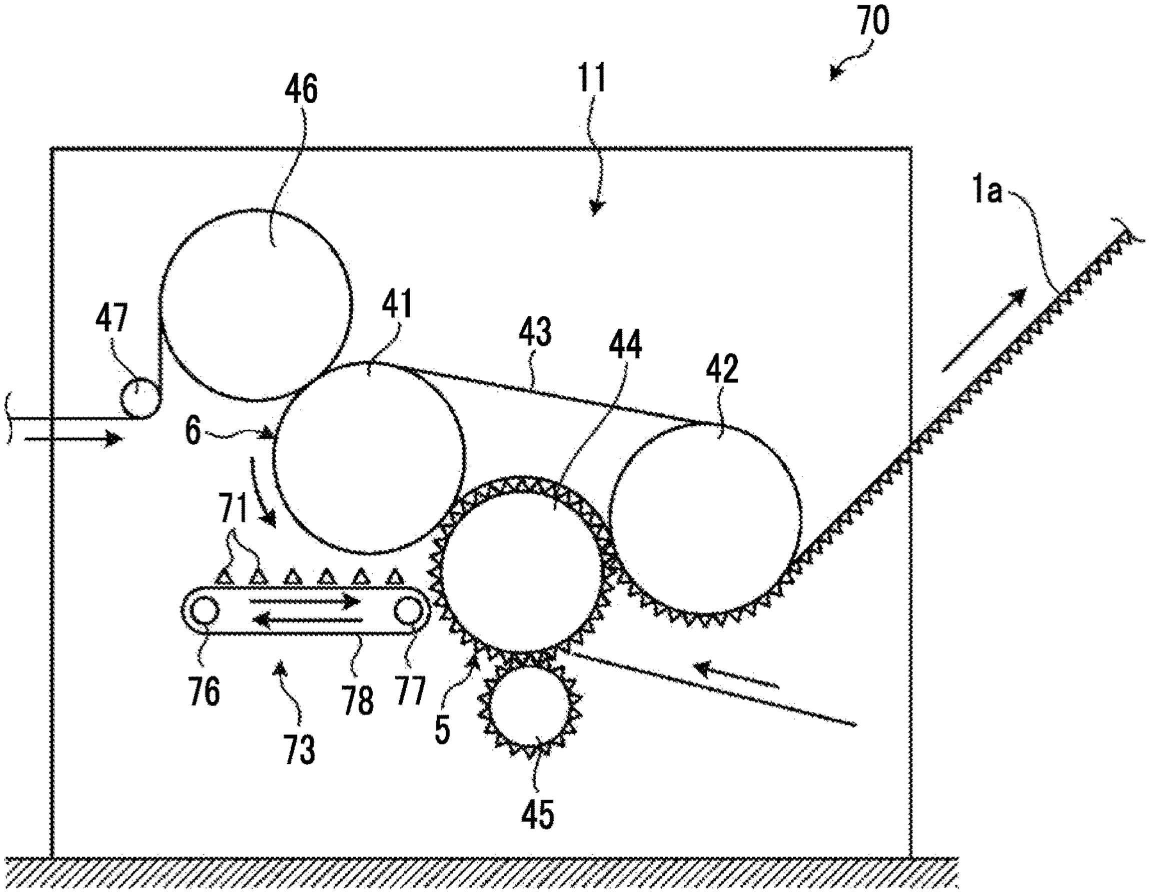
FIG. 5 is a schematic configuration diagram representing a single facer of a panel production device according to a second embodiment.
Figure 6:
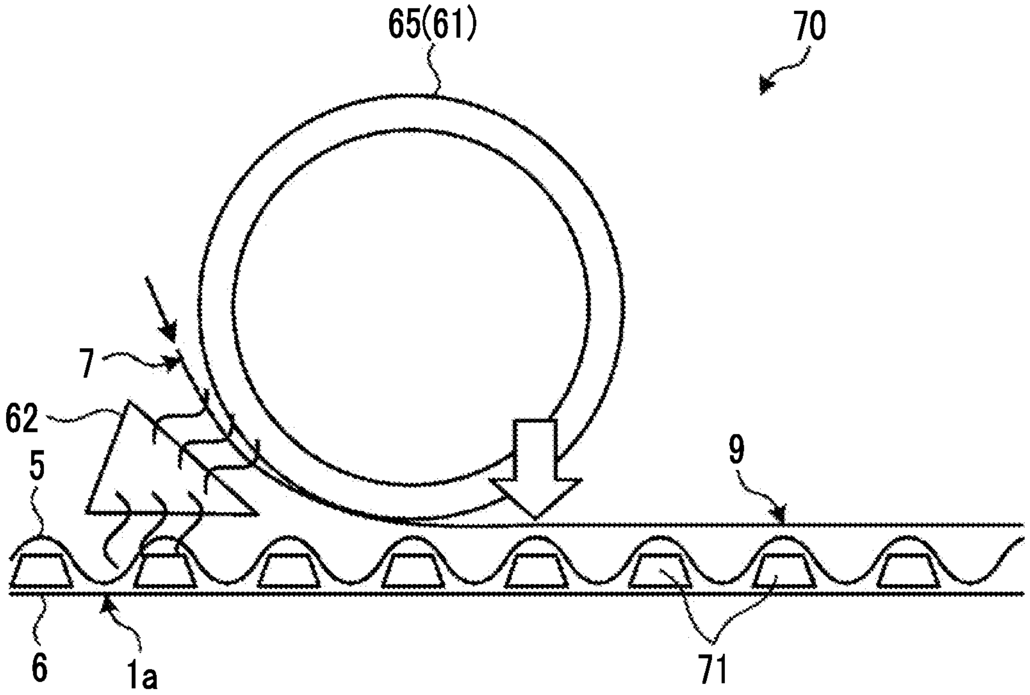
FIG. 6 is a schematic configuration diagram representing a double facer of the panel production device according to the second embodiment.

Next, a panel production device 70 according to a second embodiment will be described with reference to FIGS. 5 to 6. In the second embodiment, in order to avoid repeated description, elements different from those in the first embodiment will be described, and description will be made by assigning the same reference numerals to elements having configurations the same as those in the first embodiment. FIG. 5 is a schematic configuration diagram showing a single facer of the panel production device according to the second embodiment. FIG. 6 is a schematic configuration diagram representing a double facer of the panel production device according to the second embodiment.

(Panel Production Device)

As shown in FIGS. 5 and 6, in the panel production device 70 of the second embodiment, the single facer 11 in the panel production device 10 of the first embodiment is further provided with a foam material supply part 73.

The foam material supply part 73 is a device that supplies a foam material 71 to a space partitioned by the core member 5 and the first faceplate 6 before the joining of the core member 5 and the first faceplate 6. The foam material supply part 73 is provided at a position where the foam material 71 can be supplied to the core member 5 after being shaped by the upper corrugating roll 44 and the lower corrugating roll 45 and before being joined to the first faceplate 6.

The foam material supply part 73 has a pair of pulleys 76 and 77 and an endless transfer belt 78 wound around the pair of pulleys 76 and 77. With the disposition of the foam material 71 on the transfer belt 78 and rotation of the pair of pulleys 76 and 77, the foam material 71 on the transfer belt 78 is supplied toward the core member 5.

The foam material supply part 73 is not particularly limited to the above device configuration, any device configuration may be employed as the device configuration is such that the foam material 71 can be supplied to the space partitioned by the core member 5 and the first faceplate 6.

As shown in FIG. 6, the panel 1*a* including the foam material 71 is supplied to the double facer 12. In the double facer 12, the pressurizing roller 65 pressurizes the panel 1*a* and the second faceplate 7 at the time of the joining of the panel 1*a* and the second faceplate 7. In this case, since the foam material 71 is included between the core member 5 and the first faceplate 6, a reaction force against the pressurization by the pressurizing roller 65 can be obtained from the foam material 71. That is, since the shape of the core member 5 can be maintained by the foam material 71, it is possible to increase the pressurization applied to the panel 1*a*. Accordingly, the pressurizing part 61 can increase the pressurization at the time of the joining of the panel 1*a* and the second faceplate 7 by an amount that the reaction force can be obtained from the foam material 71.

Figure 7:
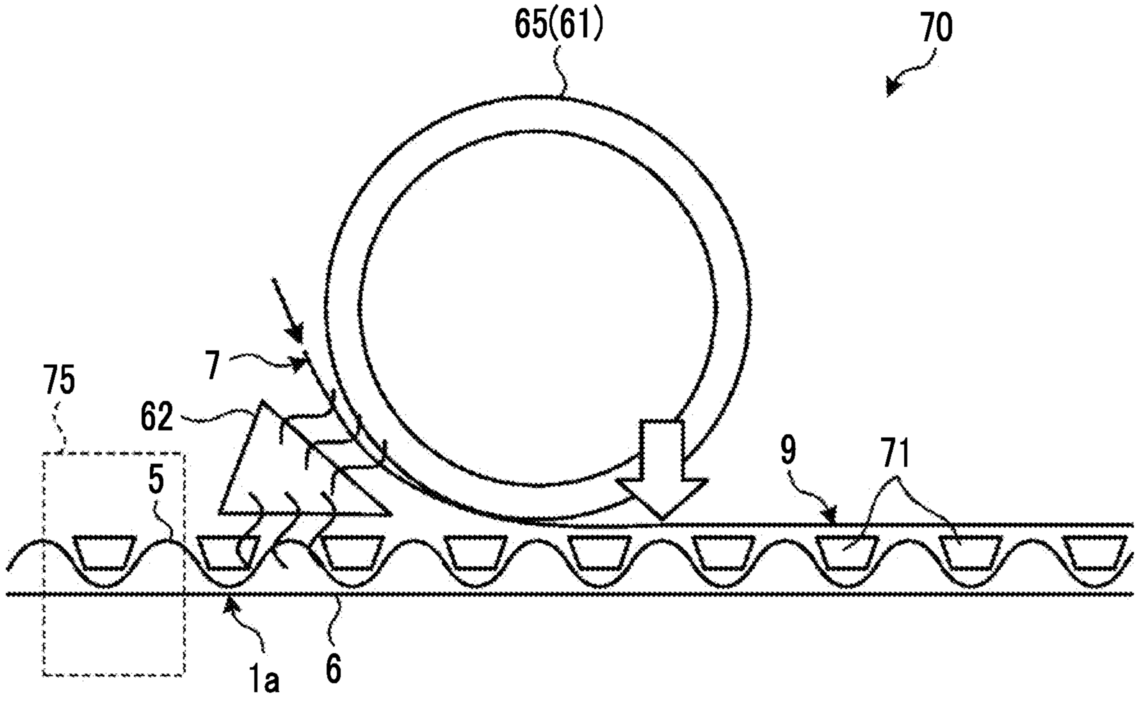
FIG. 7 is a schematic configuration diagram representing a double facer of a panel production device according to a modification example of the second embodiment.

The configuration shown in FIG. 7 may be used instead of the foam material supply part 73 of the second embodiment or in addition to the foam material supply part 73 of the second embodiment. FIG. 7 is a schematic configuration diagram showing a double facer of a panel production device according to a modification example of the second embodiment. As shown in FIG. 7, the double facer 12 of the panel production device 70 is further provided with a foam material supply part 75 that supplies the foam material 71 to a space partitioned by the core member 5 and the second faceplate 7 before the joining of the core member 5 and the second faceplate 7.

In the double facer 12 of the panel production device 70, the foam material supply part 75 supplies the foam material 71 to the space partitioned by the core member 5 and the second faceplate 7. Thereafter, in the double facer 12, the pressurizing roller 65 pressurizes the panel 1*a* and the second faceplate 7 at the time of the joining of the panel 1*a* and the second faceplate 7. In this case, since the foam material 71 is included between the panel 1*a* and the second faceplate 7, a reaction force against the pressurization by the pressurizing roller 65 can be obtained from the foam material 71. That is, since the shape of the core member 5 can be maintained by the foam material 71, it is possible to increase the pressurization applied to the panel 1*a*. Accordingly, the pressurizing part 61 can increase the pressurization at the time of the joining of the panel 1*a* and the second faceplate 7 by an amount that the reaction force can be obtained from the foam material 71.

Third Embodiment

Figure 8:
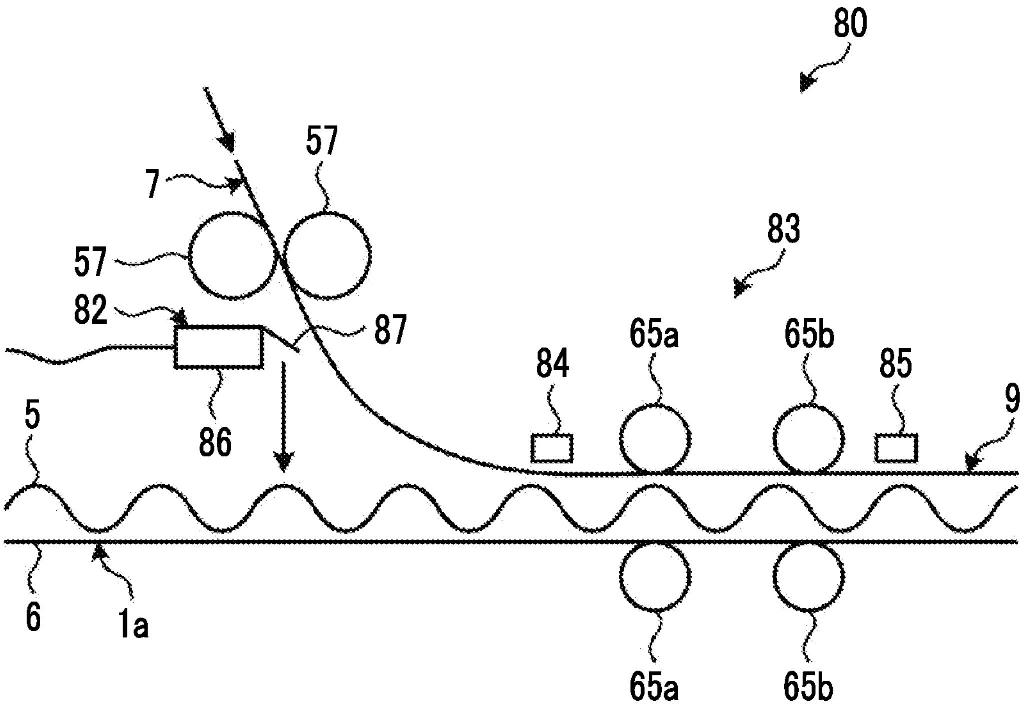
FIG. 8 is a schematic configuration diagram representing a panel production device according to a third embodiment.
Figure 9:
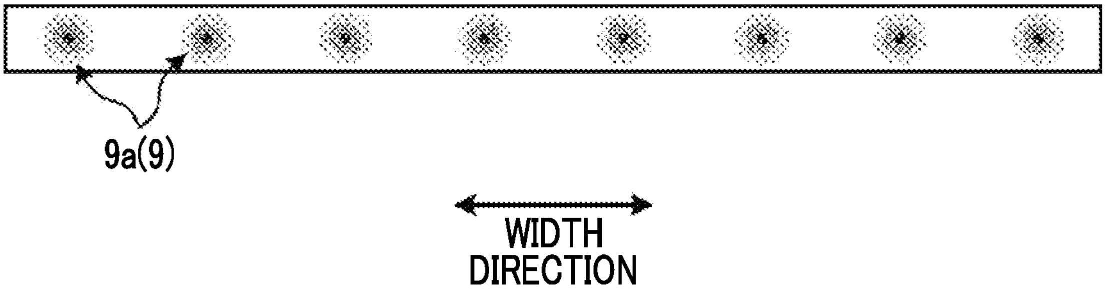
FIG. 9 is an explanatory diagram representing an example of a welding part.
Figure 10:
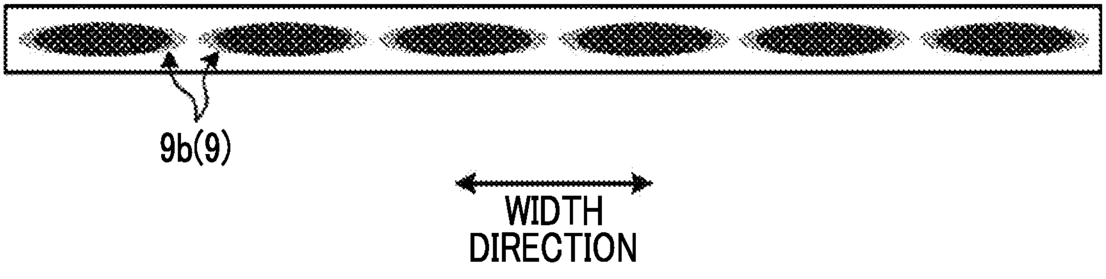
FIG. 10 is an explanatory diagram representing an example of the welding part.

Next, a panel production device 80 according to a third embodiment will be described with reference to FIGS. 8 to 10. Further, even in the third embodiment, in order to avoid duplicate description, the parts different from the first and second embodiments will be described, and the parts having the same configuration as those of the first and second embodiments will be described with the same reference numerals. FIG. 8 is a schematic configuration diagram representing a panel production device according to the third embodiment. FIG. 9 and FIG. 10 are explanatory diagrams representing examples of the welding part.

(Panel Production Device)

As shown in FIG. 8, the panel production device 80 of the third embodiment is provided with a heating part 82 instead of the heating part 62 in the panel production device 10 of the first embodiment. Further, the panel production device 80 of the third embodiment is provided with a pressurizing part 83 instead of the pressurizing part 61 of the panel production device 10 of the first embodiment. Furthermore, the panel production device 80 of the third embodiment is provided with a first temperature sensor 84 and a second temperature sensor 85.

As shown in FIG. 8, the heating part 82 includes a laser irradiation device 86 that emits the laser and a scanning part 87 that bends and scans the laser. The heating part 82 heats the core member 5 to a temperature at which the heat welding is possible. Specifically, the heating part 82 is provided at a position on an upstream side in the transfer direction of the pressurizing part 83. The heating part 82 is provided in a space formed between the core member 5 and the second faceplate 7 and heats a surface of the core member 5 facing the second faceplate 7. The heating part 82 controls an irradiation timing of the laser and the scanning by the scanning part 87 to raise the temperature of the bottom portion of the valley of the core member 5.

An example of the welding part 9 formed by the heating part 82 will be described with reference to FIGS. 9 and 10. In FIGS. 9 and 10, a left-right direction thereof is the width direction of the panel 1. A welding part 9*a* shown in FIG. 9 is a circular spot welding part formed by the laser irradiation. A welding part 9*b* shown in FIG. 10 is a wide welding part continuous in the width direction. In FIG. 10, the welding part 9*b* may be formed by the scanning of the laser in the width direction, or the welding part 9*b* may be formed by diffusion of the laser in the width direction.

The pressurizing part 83 has a pair of pressurizing rollers 65*a* on a heating side and a pair of pressurizing rollers 65*b* on a cooling side, instead of the single pressurizing roller 65 of the first embodiment. That is, the pair of pressurizing rollers 65*b* on the cooling side functions as a cooling part.

The pair of pressurizing rollers 65*a* is provided on an upstream side of the pair of pressurizing rollers 65*b* in the transfer direction and is provided at the same position as the pressurizing roller 65 of the first embodiment. The pair of pressurizing rollers 65*a* is a heating roller and is heated by a heating source (not shown) to contribute to the joining of the core member 5 and the second faceplate 7. The pressurizing roller 65*a* is connected to the control device 15, and the control device 15 controls a heating temperature.

The pair of pressurizing rollers 65*b* is provided on a downstream side of the pair of pressurizing rollers 65*b* in the transfer direction. The pair of pressurizing rollers 65*b* serves as a cooling roller and is cooled by a cooling source (not shown) to suppress alteration in the welding part 9 between the core member 5 and the second faceplate 7. The pressurizing roller 65*b* is connected to the control device 15, and the control device 15 controls a cooling temperature.

The first temperature sensor 84 is a temperature sensor that measures a temperature of a heated part, which is the welding part 9 heated by the heating part 82. The first temperature sensor 84 is connected to the control device 15, and the control device 15 controls the heating by the heating part 82 or controls the heating by the pressurizing roller 65*a* of the pressurizing part 83 based on a measurement result of the first temperature sensor 84.

The second temperature sensor 85 is a temperature sensor that measures a temperature of the welding part 9 cooled by the pressurizing roller 65*b*. The second temperature sensor 85 is connected to the control device 15, and the control device 15 controls the cooling by the pressurizing roller 65*b* of the pressurizing part 83 based on a measurement result of the second temperature sensor 85.

Fourth Embodiment

Figure 11:
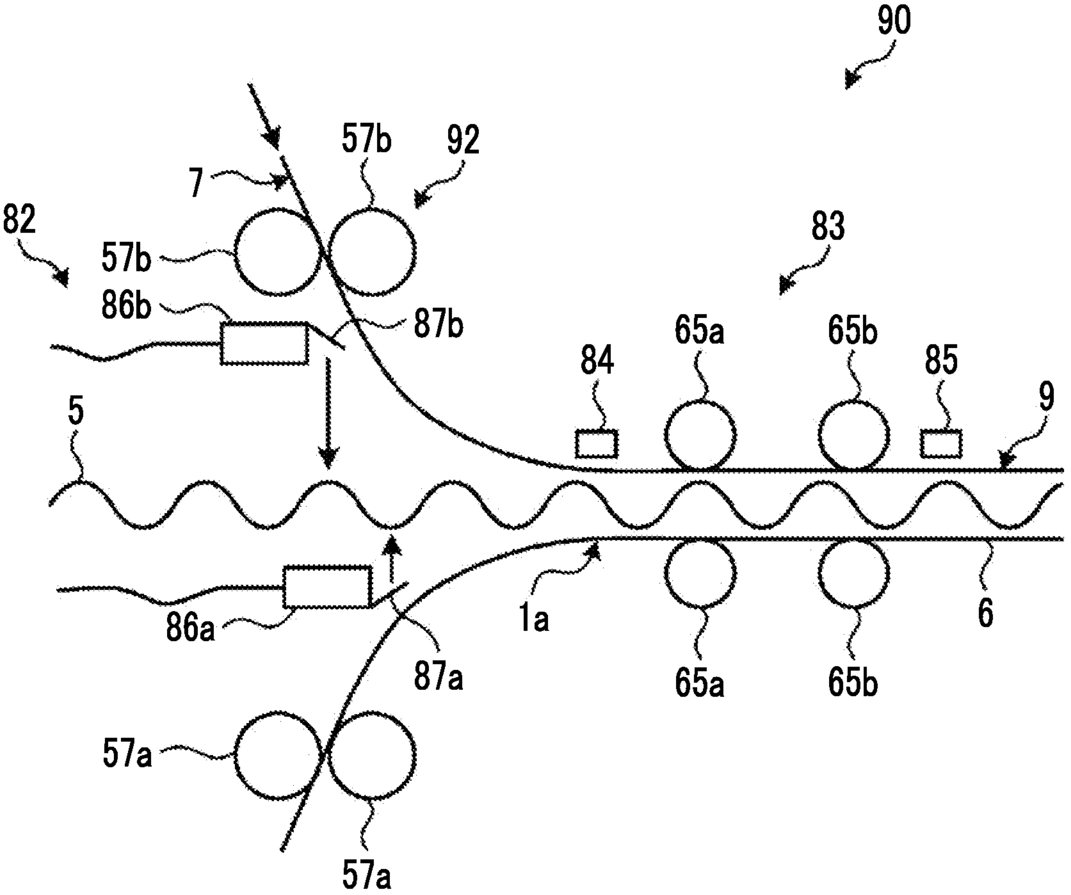
FIG. 11 is a schematic configuration diagram representing a panel production device according to a fourth embodiment.

Next, a panel production device 90 according to a fourth embodiment will be described with reference to FIG. 11. In the fourth embodiment, portions different from those in the first to third embodiments will be described in order to avoid redundant description, and portions having the same configurations as in the first to third embodiments will be described with the same reference numerals applied thereto. FIG. 11 is a schematic configuration diagram representing a panel production device according to the fourth embodiment.

As shown in FIG. 11, in the panel production device 90 of the fourth embodiment, the first faceplate 6 and the second faceplate 7 are simultaneously joined to the core member 5. That is, in the panel production device 90 of the fourth embodiment, the joining of the core member 5 and the first faceplate 6 in the single facer 11 is omitted in the panel production device 80 of the third embodiment, and the core member 5 and the first faceplate 6 are joined in the double facer 12.

In the double facer 12 of the panel production device 90 of the fourth embodiment, the supply part 92 is a device that supplies the second faceplate 6 toward a surface on one side of the core member 5 and supplies the first faceplate 7 toward a surface on the other side of the core member 5. The supply part 92 has a pair of transfer rollers 57*a* that sandwiches the first faceplate 6 and delivers the first faceplate 6 toward the pressurizing part 83. The supply part 92 has a pair of transfer rollers 57*b* that sandwiches the second faceplate 7 and delivers the second faceplate 7 toward the pressurizing part 83.

The heating part 82 includes two laser irradiation devices 86*a* and 86*b* that emit the laser and two scanning parts 87*a* and 87*b* that bend and scan the laser. The heating part 82 heats the core member 5 to a temperature at which the heat welding is possible. Specifically, the heating part 82 is provided at a position on an upstream side in the transfer direction of the pressurizing part 83. In the heating part 82, the laser irradiation device 86*a* and the scanning part 87*a* are provided in a space formed between the core member 5 and the first faceplate 6, and the surface of the core member 5 facing the first faceplate 6 is heated. Further, in the heating part 82, the laser irradiation device 86*b* and the scanning part 87*b* are provided in a space formed between the core member 5 and the second faceplate 7, and the surface of the core member 5 facing the second faceplate 7 is heated. The laser irradiation devices 86*a* and 86*b* and the scanning parts 87*a* and 87*b* are the same as those in the third embodiment, and thus the description thereof will be omitted.

In the heating using the laser irradiation devices of the third and fourth embodiments, the first faceplate 6 and the second faceplate 7 may be heated in addition to the core member 5.

In the first to fourth embodiments, the core member 5, the first faceplate 6, and the second faceplate 7, which have a continuous sheet shape, are continuously supplied. However, the core member 5, the first faceplate 6, and the second faceplate 7 may be intermittently supplied as single wafers.

As described above, the panel production devices 10, 70, 80, and 90, the panel production method, and the panel 1 described in the embodiments are grasped as follows, for example.

Panel production devices 10, 70, 80, and 90 according to a first aspect include a transfer part 51 that transfers, in a transfer direction, a panel 1*a* having a core member 5 that includes a thermoplastic resin and is formed in a corrugated shape and, a first faceplate 6 that includes a thermoplastic resin, is formed in a plate shape, and is joined to a surface on one side of the core member 5, supply parts 52 and 92 that supply, toward a surface on the other side of the core member 5, a second faceplate 7 that includes a thermoplastic resin and is formed in a plate shape, heating parts 62 and 82 that heat at least one surface of respective surfaces of the core member 5 and the second faceplate 7 facing each other, and pressurizing parts 61 and 83 that pressurize and weld the core member 5 of the panel 1*a* and the second faceplate 7.

With the above configuration, the heating parts 62 and 82 heat at least one surface of respective surfaces of the core member 5 and the second faceplate 7 facing each other, and thus it is possible to suitably weld the core member 5 and the second faceplate 7 without deformation of the core member 5 due to the pressurization of the pressurizing parts 61 and 83.

In a second aspect, the heating parts 62 and 82 have a wedge shape that tapers toward a space between the core member 5 and the second faceplate 7 to be welded or a flat plate shape extending toward a space between the core member 5 and the second faceplate 7 to be welded.

With the above configuration, since the heating part 62 can perform the heating until immediately before the core member 5 and the second faceplate 7 are welded, it is possible to suitably weld the core member 5 and the second faceplate 7.

In a third aspect, a first temperature sensor 84 that measures a temperature of a heated part (welding part 9) heated by the heating parts 62 and 82, and a control unit (control device 15) that controls the heating by the heating parts 62 and 82 based on a measurement result of the first temperature sensor 84 are further provided.

With the above configuration, in a case where the core member 5 of the panel 1*a* and the second faceplate 7 are joined to each other, it is possible to set the heating temperature of the heated part to an appropriate temperature.

In a fourth aspect, a cooling part (pressurizing roller 65*b*) that cools the welded panel 1*a* and second faceplate 7 is further provided.

With the above configuration, since the welding part 9 where the core member 5 of the panel 1*a* and the second faceplate 7 are welded can be cooled, it is possible to suppress the alteration of the welding part 9.

In a fifth aspect, a second temperature sensor 85 that measures a temperature of a cooled part cooled by the cooling part, and a control unit (control device 15) that controls the cooling by the cooling part based on a measurement result of the second temperature sensor 85 are further provided.

With the above configuration, it is possible to set the cooling temperature of the welding part 9 to an appropriate temperature.

In a sixth aspect, the panel 1*a* further has a foam material 71 provided in a space partitioned by the core member 5 and the first faceplate 6.

With the above configuration, since the reaction force can be obtained from the panel 1*a* by the foam material 71 in a case where the pressurization by the pressurizing part 61 is performed, it is possible to suppress deformation of the core member 5 and to suitably perform the pressurization.

In a seventh aspect, a foam material supply part 73 that supplies the foam material to the space partitioned by the core member 5 and the first faceplate 6 before the joining of the core member 5 and the first faceplate 6 is further provided.

With the above configuration, it is possible to produce and supply the panel 1*a* including the foam material 71 with the foam material supply part 73.

A panel production method according to an eighth aspect includes a step of transferring, in a transfer direction, a panel having a core member that includes a thermoplastic resin and is formed in a corrugated shape and, a first faceplate that includes a thermoplastic resin, is formed in a plate shape, and is joined to a surface on one side of the core member, a step of supplying, toward a surface on the other side of the core member, a second faceplate that includes a thermoplastic resin and is formed in a plate shape, a step of heating at least one surface of respective surfaces of the core member and the second faceplate facing each other, and a step of pressurizing and welding the core member of the panel and the second faceplate.

With the above configuration, at least one surface of the respective surfaces of the core member 5 and the second faceplate 7 facing each other is heated, and thus it is possible to suitably weld the core member 5 and the second faceplate 7 without deformation of the core member 5 due to the pressurization. With intermittent heating of the top of the peak of the core member 5, it is possible to weld the core member 5 and the second faceplate 7 without deformation of the core member 5.

REFERENCE SIGNS LIST

1: panel
1*a*: panel

5: core member
6: first faceplate
7: second faceplate
9: welding part
10: panel production device
11: single facer
12: double facer
15: control device
51: transfer part
52: supply part
61: pressurizing part
62: heating part
65: pressurizing roller
70: panel production device (second embodiment)
71: foam material
73: foam material supply part
75: foam material supply part
80: panel production device (third embodiment)
82: heating part
83: pressurizing part
84: first temperature sensor
85: second temperature sensor
86: laser irradiation device
87: scanning part
90: panel production device (fourth embodiment)
92: supply part

The invention claimed is:

1. A panel production device comprising:

a transfer part configured to transfer a panel in a transfer direction, the panel having a core member that includes a thermoplastic resin and is formed in a corrugated shape, and a first faceplate that includes a thermoplastic resin, is formed in a plate shape, and is joined to a surface on a first side of the core member;

a supply part configured to supply a second faceplate toward a surface on a second side of the core member, the first and second sides of the core member being opposite sides, the second faceplate including a thermoplastic resin and being formed in a plate shape;

a heating part configured to heat a surface of the core member facing the second faceplate; and a pressurizing part configured to pressurize and weld the core member of the panel and the second faceplate, wherein the core member has a shape in which peaks and valleys are alternately and continuously formed, wherein the heating part is provided at a position on an upstream side of the pressurizing part relative to the transfer direction, and has a shape which extends toward a space between the core member and the second faceplate to be welded, and wherein the heating part includes a laser irradiation device that emits a laser and a scanning part that bends and scans the laser, and raises a temperature of tops of the peaks of the core member relative to bottoms of the valleys of the core member by scanning the laser irradiated from the laser irradiation device with the scanning part.

2. The panel production device according to claim 1, further comprising:

a first temperature sensor that measures a temperature of a heated part heated by the heating part; and a control unit that controls the heating by the heating part based on a measurement result of the first temperature sensor.

3. The panel production device according to claim 1, further comprising:

a cooling part that cools the welded panel and second faceplate.

4. The panel production device according to claim 3, further comprising:

a second temperature sensor that measures a temperature of a cooled part cooled by the cooling part; and a control unit that controls the cooling by the cooling part based on a measurement result of the second temperature sensor.

5. The panel production device according to claim 1, wherein the panel further has a foam material provided in a space partitioned by the core member and the first faceplate.

6. The panel production device according to claim 5, further comprising:

a foam material supply part that supplies the foam material to the space partitioned by the core member and the first faceplate before the joining of the core member and the first faceplate.

7. A panel production method comprising:

transferring, in a transfer direction, a panel having a core member that includes a thermoplastic resin and is formed in a corrugated shape, and a first faceplate that includes a thermoplastic resin, is formed in a plate shape, and is joined to a surface on a first side of the core member;

supplying a second faceplate toward a surface on a second side of the core member, the first and second sides of the core member being opposite sides, the second faceplate including a thermoplastic resin and being formed in a plate shape;

heating a surface of the core member facing the second faceplate; and pressurizing and welding the core member of the panel and the second faceplate, wherein the heating is performed with a heating part, and the pressurizing and welding is performed with a pressurizing part, wherein the core member has a shape in which peaks and valleys are alternately and continuously formed, wherein the heating part is provided at a position on an upstream side of the pressurizing part relative to the transfer direction, and has a shape which extends toward a space between the core member and the second faceplate to be welded, wherein the heating part includes a laser irradiation device that emits a laser and a scanning part that bends and scans the laser, and wherein the heating includes raising a temperature of tops of the peaks of the core member relative to bottoms of the valleys of the core member by scanning the laser irradiated from the laser irradiation device with the scanning part.

* * * * *